UNITED STATES PATENT OFFICE.

BIRGER FJELD HALVORSEN, OF CHRISTIANIA, NORWAY.

METHOD FOR THE PRODUCTION OF ALUMINA.

1,333,020.  Specification of Letters Patent.  Patented Mar. 9, 1920.

No Drawing.   Application filed October 30, 1919. Serial No. 334,566.

*To all whom it may concern:*

Be it known that I, BIRGER FJELD HALVORSEN, citizen of Norway, residing at 71 Oscars Gate, Christiania, Norway, have invented certain new and useful Improvements in Methods for the Production of Alumina, of which the following is a specification.

If aluminum oxid is to be produced from aluminous solutions, such as are obtained, for example, by dissolving labradorite or minerals containing the same, in acids, it is well known that it is difficult to precipitate the aluminum in such a form, that it may be readily filtered off and washed.

The inventor has now made some new discoveries of which each in itself may give rise to improvements in the old methods and which, when combined, will give a specially profitable method of working.

Firstly it appears, when precipitating aluminum-hydroxid with ammonia, that the precipitates deposit better and quicker when the reaction mixture is heated in an autoclave up to a temperature above 100° C. It is possible to deposit the precipitate so completely, that the limpid or clear fluid or at least the greater part thereof, may be removed by decantation. It may also be easily filtered off. The principle may be employed either by effecting the admixture of ammonia under pressure or by mixing the aluminum-solution with the ammonia at atmospheric pressure, whereupon the mixture is heated in an autoclave. The further treatment of the precipitate may be carried out in known ways, or better, according to the methods which will be described below.

Secondly the inventor has found out, that the colloidal aluminum hydroxid, which is obtained by precipitating with ammonia, when dried and heated to temperature of 100-200° C., will lose its collodial structure and become an insoluble powder, which easily may be filtered off and washed. It is not necessary to heat so highly that the solubility of the soluble admixture, such as alkaline salts and salts of the alkaline earths, becomes altered.

As the result of this discovery, it is apparent that pure aluminum oxid may be obtained by precipitating it in the usual manner, whereupon the precipitate, after the first filtering, is dried and heated to temperatures between 100 and 200° C. Thereupon it is stirred up with water, filtered and washed.

This second feature is of great importance when combined with the first mentioned steps, because the drying would not be technically profitable, without a practical mode of removing the greater portion of the water from the precipitate.

The combined method may be carried out, for example, as follows:

In the solution of aluminum salts, the necessary amount of ammonia is added while stirring the liquid. The reaction mixture is run into an autoclave and heated for about 8 hours to a pressure of 10–15 atmospheres, whereupon the mass is brought into the deposition receptacle in which the greater part of the fluid is drawn off. After having been filtered in a suitable way, *e. g.*, by suction, the precipitate is heated to, say, 150° C., whereupon water is added, and the precipitate is washed and filtered.

The liquid which was filtered from the aluminum-hydroxid may be used for the decomposition of more labradorite. By heating, labradorite with the said solution (which contains an ammonium salt), preferably under pressure, the salts of alkali and of alkaline earths will pass into solution, and pure aluminum silicate will be left. During this operation, ammonia is set free, which may be utilized for a new precipitation. If the decomposition of the lebradorite is effected under pressure, it is convenient to drive the ammonia into the precipitation receptacle under pressure. The pure aluminum silicate remaining from the reaction of the liquor on the labradorite can then be treated with acid to form aluminum salts in known manner.

I claim:

1. A method of producing alumina from solutions from aluminum compounds by precipitation with ammonia, which comprises the step of heating the reaction mass under pressure.

2. The improvement in the production of alumina from aluminous solutions, which comprises precipitating with ammonia, drying the precipitates containing aluminum hydrate, and heating the same to temperatures between 100 and 200° C., in order to facilitate the subsequent washing.

3. A method of regenerating ammonia employed in the precipitation of aluminum hydrate, which comprises heating the filtrate from the aluminum hydroxid precipitation, which filtrate contains ammonium salts, together with easily decomposable aluminum silicates containing alkali metal compounds and alkaline earth metal compounds, whereby the ammonia is driven out while the alkalis and the alkaline earths pass into solution, and aluminum silicate is left.

4. In the process of claim 3, the improvement which comprises conducting the regenerated ammonia into a precipitation bath containing aluminum salts in solution, such operation being effected under pressure.

5. A method of treating materials containing labradorite, which comprises boiling the said material with a solution containing an ammonium salt, under superatmospheric pressure, thereafter reacting upon the residue of such operation with an acid capable of dissolving at least a substantial part of the aluminum content of the labradorite, passing into the solution formed in said last mentioned step while under pressure, the ammonia regenerated in said first mentioned step, to precipitate aluminum hydroxid in a readily separable condition, separating the aluminum hydroxid from the bulk of the liquor and returning the said liquor to the first step of the process, drying the precipitate containing aluminum hydroxid and heating the same to a temperature between 100 and 200° C., and thereafter mixing such precipitate with water and washing the same and removing the precipitate from the liquor.

In testimony whereof I affix my signature.

BIRGER FJELD HALVORSEN.